(12) United States Patent
Akai et al.

(10) Patent No.: US 12,291,042 B2
(45) Date of Patent: May 6, 2025

(54) DROPLET DISCHARGE DEVICE AND DROPLET DISCHARGE METHOD

(71) Applicants: Takeshi Akai, Kanagawa (JP); Yu Yamaya, Gifu (JP); Takahiko Matsumoto, Kanagawa (JP); Yusuke Nonoyama, Kanagawa (JP); Daisuke Arai, Tokyo (JP)

(72) Inventors: Takeshi Akai, Kanagawa (JP); Yu Yamaya, Gifu (JP); Takahiko Matsumoto, Kanagawa (JP); Yusuke Nonoyama, Kanagawa (JP); Daisuke Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 18/177,983

(22) Filed: Mar. 3, 2023

(65) Prior Publication Data
US 2023/0302828 A1 Sep. 28, 2023

(30) Foreign Application Priority Data
Mar. 22, 2022 (JP) ................... 2022-045889

(51) Int. Cl.
*B41J 25/00* (2006.01)
(52) U.S. Cl.
CPC .................. *B41J 25/006* (2013.01)
(58) Field of Classification Search
CPC ...... B41J 25/006; B41J 11/0095; B41J 11/20; B41J 3/4073; B41J 25/308; G01N 35/1011; G01N 35/109; B01L 3/502715
See application file for complete search history.

(56) References Cited

U.S. PATENT DOCUMENTS

| | | | |
|---|---|---|---|
| 2008/0211849 A1 | 9/2008 | Pierik et al. | |
| 2022/0274405 A1 | 9/2022 | Midorikawa et al. | |
| 2023/0103754 A1* | 4/2023 | Nonoyama | B01L 3/502715 |
| | | | 422/503 |

FOREIGN PATENT DOCUMENTS

| | | |
|---|---|---|
| JP | 2005-138013 | 6/2005 |
| JP | 5455370 | 3/2014 |
| JP | 2020-080831 | 6/2020 |
| JP | 2021-084421 | 6/2021 |
| JP | 2021-137792 | 9/2021 |

* cited by examiner

*Primary Examiner* — Bradley W Thies
(74) *Attorney, Agent, or Firm* — IPUSA, PLLC

(57) ABSTRACT

A droplet discharge device for discharging a droplet into recess parts of a storage vessel includes a storage vessel, a discharge head configured to insert a discharge surface into a recess part and discharge droplets while moving in two horizontal directions, a mounting table, a vertical position adjusting part configured to change a relative vertical position between the head and table, a vertical position adjustment control part configured to control the adjusting part, a horizontal position detecting part configured to detect a horizontal position of the storage vessel, and a target position detecting part configured to detect, before starting discharge, a distance from a vertical reference height to a discharge target surface, wherein the control part controls, based on the detected distance, the vertical position of the head or table during the discharge such that a discharge height of the discharge surface relative to the discharge target surface stays constant.

9 Claims, 14 Drawing Sheets

FIG.5
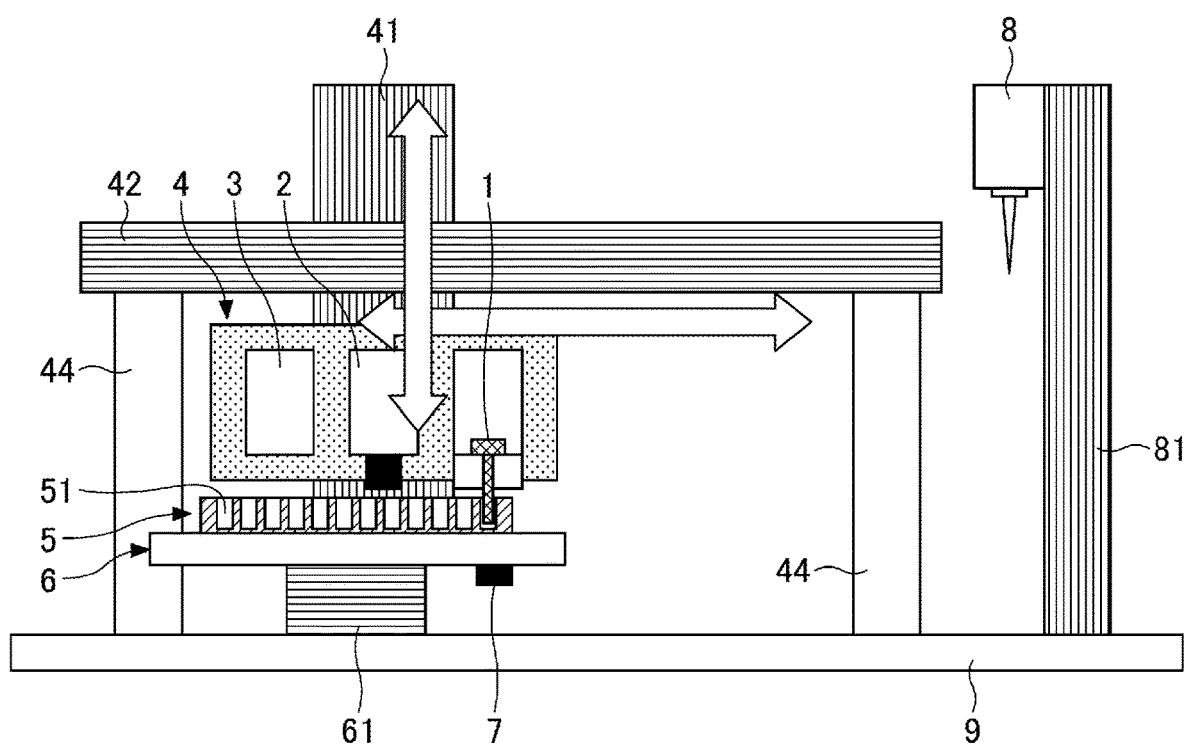
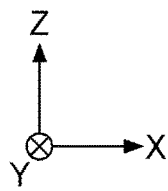

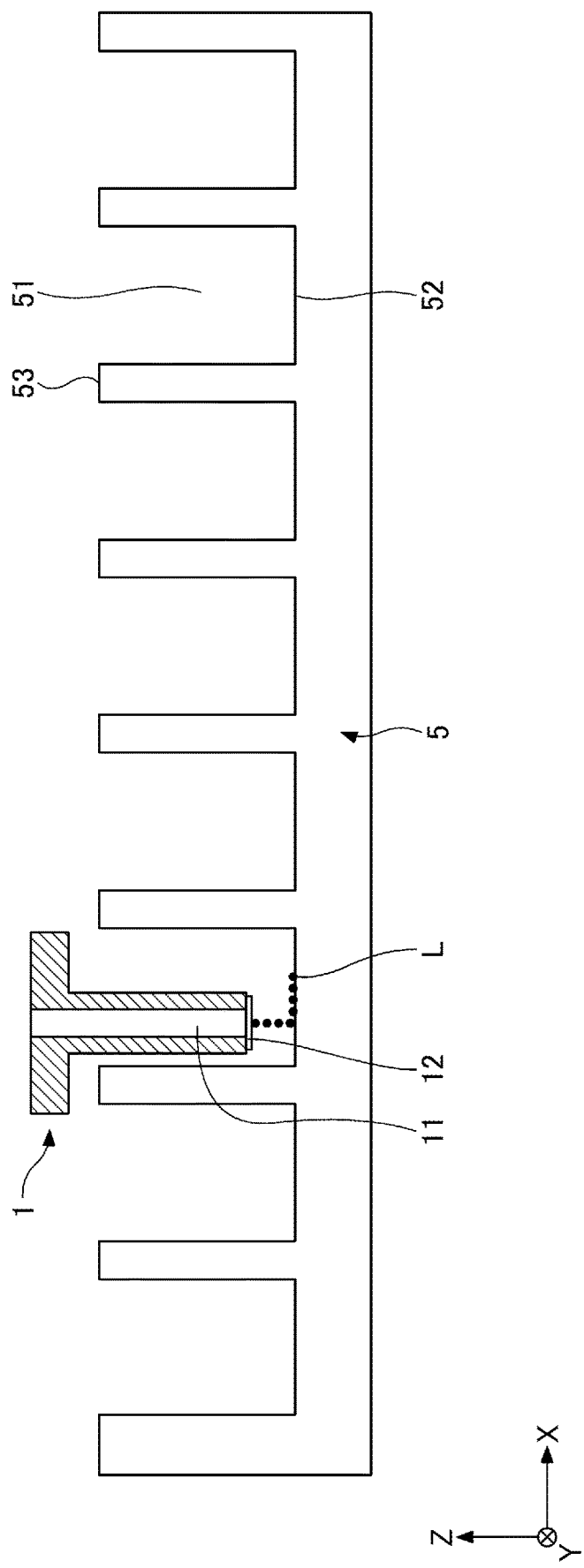

DROPLET DISCHARGE DEVICE AND DROPLET DISCHARGE METHOD

CROSS-REFERENCE TO RELATED APPLICATION

The present application is based on and claims priority under 35 U.S.C. § 119 to Japanese Patent Application No. 2022-045889, filed on Mar. 22, 2022, the contents of which are incorporated herein by reference in their entirety.

BACKGROUND OF THE INVENTION

1. Field of the Invention

The present disclosure relates to a droplet discharge device and a droplet discharge method for discharging a droplet into recess parts of a storage vessel.

2. Description of the Related Art

Conventionally, as know in the inkjet technology, a droplet landing position is adjusted by detecting the position of a droplet discharged from a discharge head and adjusting the position of the discharge head based on the detected droplet position.

In recent years, the droplet discharge device has not been limited to printing, and may discharge droplets onto a discharge target having uneven surface, such as a biological sample, a film forming material of an electric circuit, an organic EL, or a glass substrate. Japanese Unexamined Patent Application Publication No. 2005-138013 discloses a discharge operation in which detection device for detecting uneven surfaces, which is an optical sensor, detects the uneven surface shape of a discharge target while moving in the predetermined direction, and a discharge head discharges droplets with the height of the head being adjusted according to the detected shape of the target surface while moving in the predetermined direction.

On the other hand, in recent years, with the progress of stem cell technology, a technology for placing a tissue body including a plurality of cells at a desired position has been developed. For example, in the fields such as drug discovery and toxicity evaluation, a technique has been developed in which an assay that is a test for confirming a response of a cell to a drug is performed using a well plate (vessel) having a plurality of wells (recess parts) that are well-shaped holes. In this technology, a tissue body is placed in the well plate, and a phenomenon occurring in a human body is reproduced in the well plate.

However, in the Japanese Unexamined Patent Application Publication No. 2005-138013, since the discharge head is adjusted in the vertical direction while being moved in the horizontal direction for a discharge target having a less uneven surface, only slight unevenness can be dealt with. Therefore, in a case where a droplet is discharged to a storage vessel such as a well plate having deep recess parts, when the discharge head continuously moves between a position facing the recess part and a position not facing the recess part, the amount of movement in the vertical direction becomes larger than the amount of movement in the horizontal direction. That is, the above-mentioned control takes too much time to deal with the vertical movement in the middle of the horizontal movement.

To solve the problem of the conventional technology described above, it is an object of the present disclosure to provide a droplet discharge device which can perform a discharge operation suitable for the depth of a recess part formed in a storage vessel as a discharge target.

SUMMARY OF THE INVENTION

According to one aspect of the present invention, there is provided a droplet discharge device for discharging a droplet into recess parts of a storage vessel; the droplet discharge device including the storage vessel having a plurality of recess parts configured to store discharged droplets; a discharge head configured to insert a discharge surface having a nozzle hole for discharging the droplet into the recess part of the storage vessel and discharge the droplet into the recess part while moving in two horizontal directions; a mounting table on which the storage vessel is mounted; a vertical position adjusting part configured to vertically move the discharge head or the mounting table to change a relative vertical position between the discharge head and the mounting table; a vertical position adjustment control part configured to control the vertical position adjusting part; a horizontal position detecting part configured to detect the horizontal position of the storage vessel mounted on the mounting table; and a target position detecting part configured to detect, before starting discharge into a first recess part of the storage vessel, a distance from a vertical reference height to a discharge target surface of the first recess part, wherein the vertical position adjustment control part controls, based on the detected distance to the discharge target surface of the first recess part, the vertical position of the discharge head or the mounting table during the discharge to the first recess part such that a discharge height of the discharge surface relative to the discharge target surface stays constant.

The droplet discharge device according to one embodiment can perform a discharge operation suitable for the depth of the recess part formed in the storage vessel as the discharge target.

BRIEF DESCRIPTION OF THE DRAWINGS

FIG. 5 is an overall side view of the droplet discharge device during discharge operation according to the first embodiment;

FIG. 6 is an enlarged view illustrating a discharge head and the storage vessel during the discharge operation;

DESCRIPTION OF THE EMBODIMENTS

Figure 1:
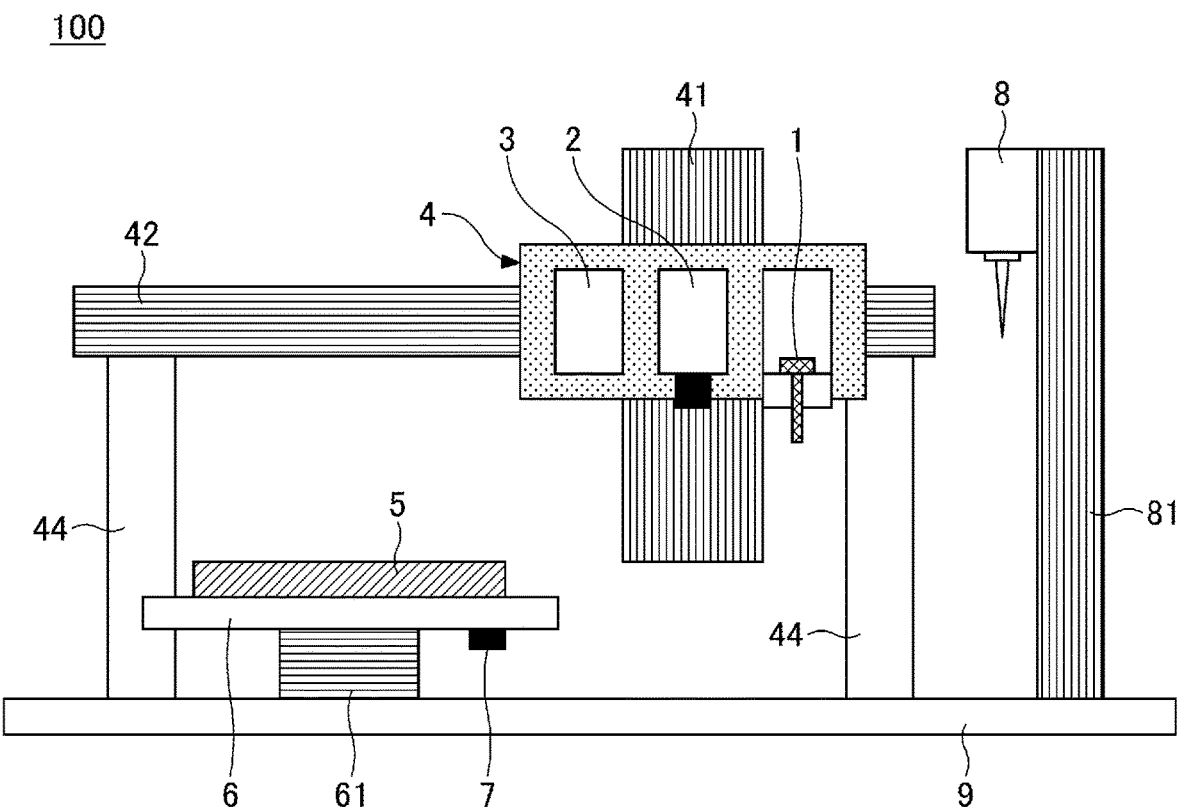
FIG. 1 is an overall side view of a droplet discharge device according to the first embodiment.

Embodiments will be described below with reference to the drawings. In the drawings, parts having the same configuration are denoted by the same reference numerals, and redundant description is appropriately omitted.

Overall Configuration

Figure 2:
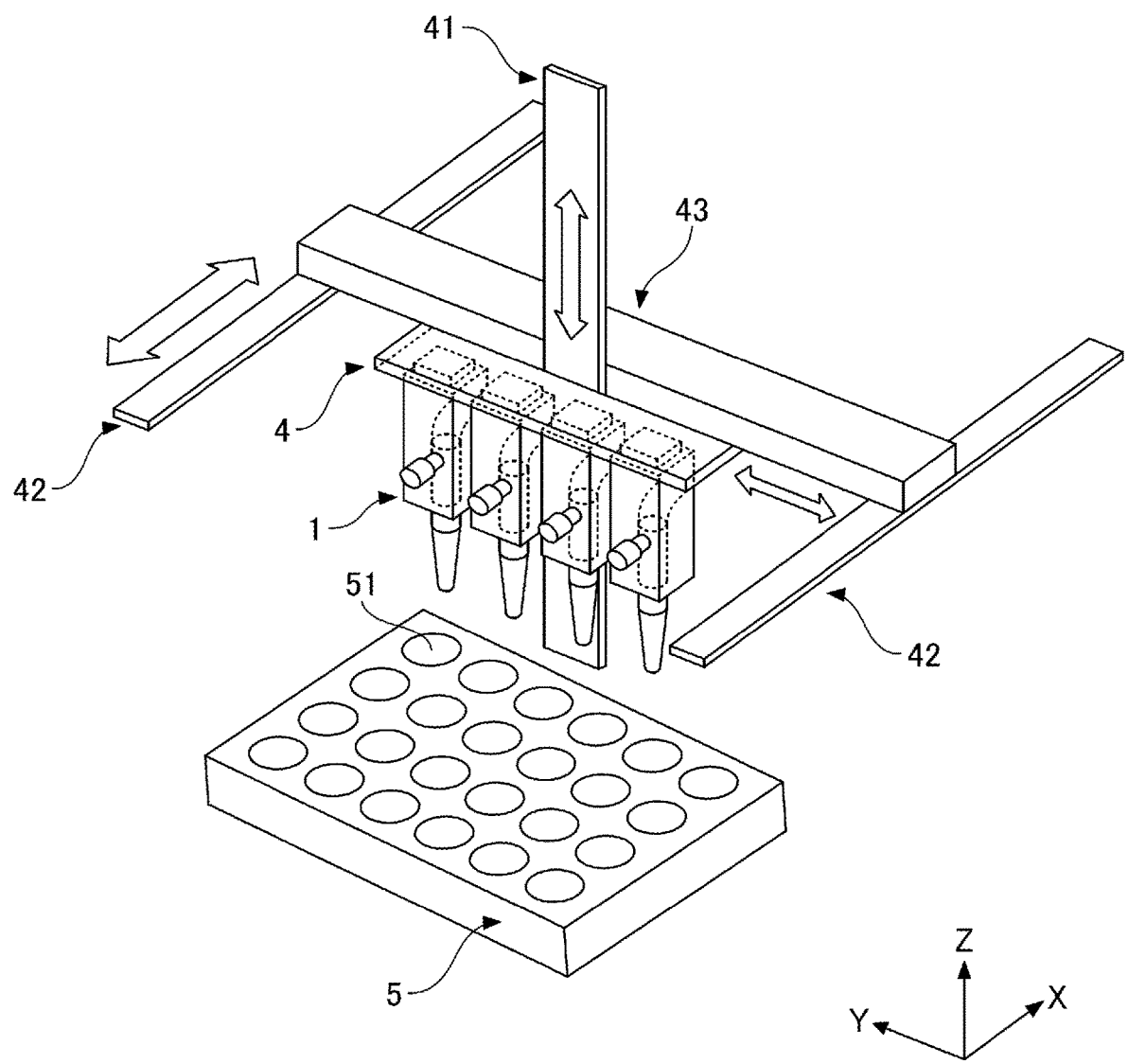
FIG. 2 is a schematic perspective view illustrating movement of a carriage relative to a storage vessel according to the first embodiment.
Figure 3:
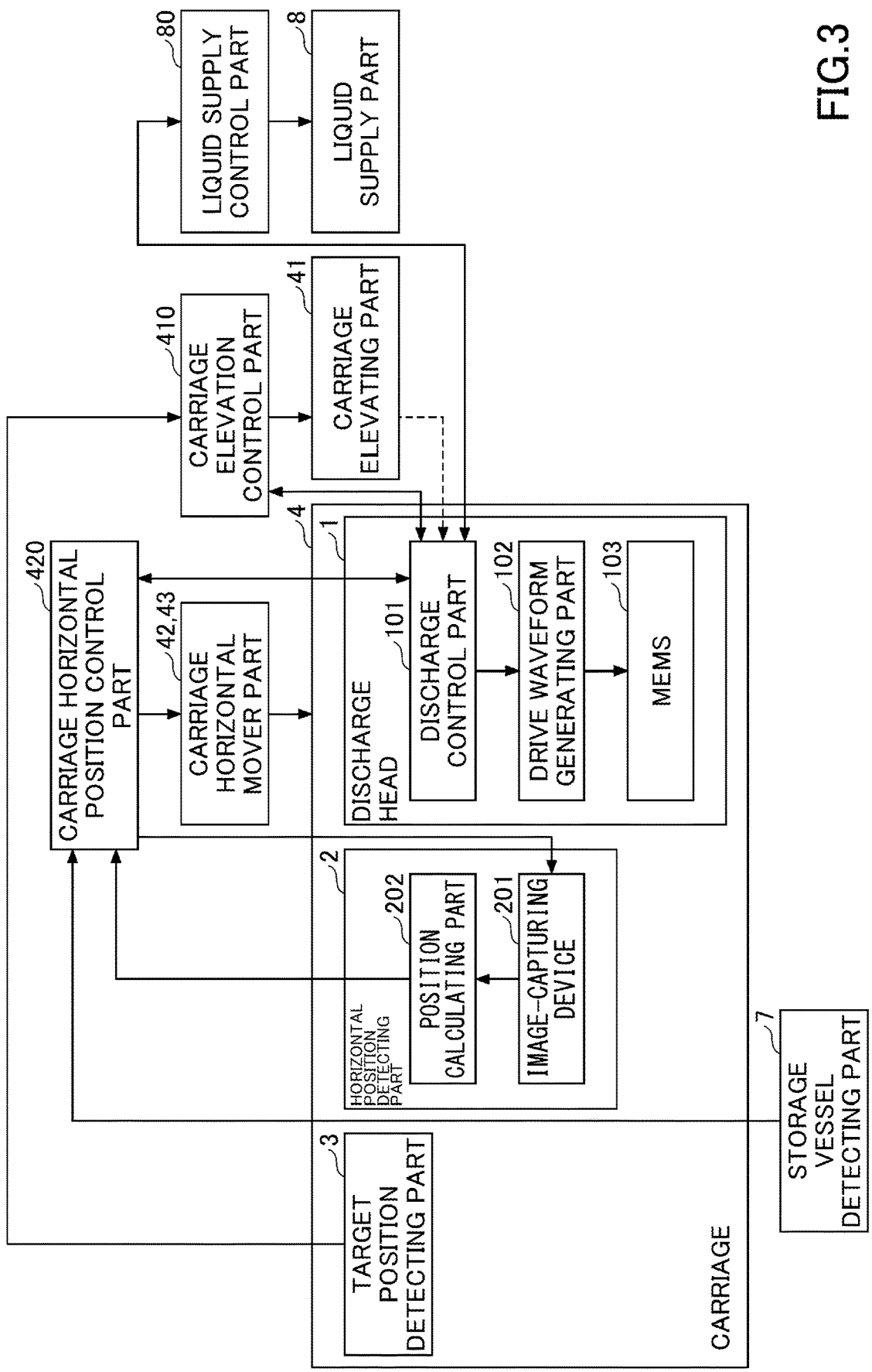
FIG. 3 is a schematic control block diagram of the droplet discharge device according to the first embodiment.

With reference to FIG. 1, FIG. 2, and FIG. 3, the overall configuration of a droplet discharge device according to the first embodiment of the present disclosure will be described. FIG. 1 is an overall side view of a droplet discharge device 100 according to the first embodiment. FIG. 2 is a schematic perspective view illustrating movement of a carriage 4 relative to a storage vessel according to the first embodiment. FIG. 3 is a schematic control block diagram of the droplet discharge device 100 according to the first embodiment.

As shown in FIG. 1 and FIG. 2, in the droplet discharge device 100 according to the first embodiment, a discharge head 1 discharges droplets while the carriage 4 on which the discharge head 1 is mounted moves in the vertical direction and the horizontal direction, relative to a recess part 51 of a storage vessel 5 on a fixed mounting table 6.

In the droplet discharge device 100, the carriage 4 is provided with the discharge head 1, a horizontal position detecting part 2, and a target position detecting part 3.

The discharge head 1 of the present embodiment inserts a discharge surface 12 in which a nozzle hole 11 for discharging droplets is formed into the recess part 51 of the storage vessel 5, and while moving in the horizontal directions, discharges the droplets into the recess part 51 so that the droplets are landed on the bottom portion of the recess part 51. The discharge head 1 is, for example, an ink jet type discharge head.

There are provided a carriage elevating part (vertical position adjusting part) 41 and carriage horizontal mover parts (head horizontal mover parts) 42 and 43 to move the carriage 4 supporting the discharge head 1, and these three parts are supported by a box-shaped or plate-shaped (pillar-shaped) carriage supporting unit 44.

Here, in FIG. 1, only the movement of the carriage 4 in the X-direction and the Z-direction is shown. However, as illustrated in FIG. 2, in addition to being movable in the vertical direction (the Z-direction), the carriage 4 can be moved in the two horizontal directions orthogonal to the vertical direction that are the X-direction and the Y-direction. In FIG. 2, the horizontal position detecting part 2 and the target position detecting part on the carriage 4 are not shown for the sake of explanation.

The carriage 4 is configured to be movable by a combination of three directional single-axis robots (also referred to as single-axis stages or single-axis sliders). As shown in FIG. 2, the carriage 4 is slidable in the vertical direction relative to Z-axis rail which is the vertical position adjusting part 41 extending in the vertical direction. Specifically, the Z-axis rail 41 and the carriage 4 form one of the single-axis robots, a ball screw extending in the vertical direction and a motor are provided in the Z-axis rail, and the carriage 4 functions as a slider. When the motor rotates according to the instruction, the ball screw rotates in conjunction with the motor, and the carriage 4 serving as the slider moves by the rotation of the ball screw. Therefore, the vertical position of the carriage 4 serving as the slider is controlled by the amount of rotation of the motor.

Similarly, the Z-axis rail 41 that movably holds the carriage 4 is held by the Y-axis rail 43, and the Z-axis rail 41 is slidable in the Y-axis direction as a slider. Further, the Y-axis rail 43 is held by the two X-axis rails 42, and is slidable in the X-axis direction as a slider.

With such a structure, since the carriage 4 is movable in three directions of X, Y, and Z, it is possible to relatively move the discharge head 1 and the storage vessel 5 in the two-dimensional plane and the vertical direction.

The horizontal position detecting part 2 detects a horizontal position of the storage vessel 5 placed on the mounting table 6. Referring to FIG. 3, the horizontal position detecting part 2 includes an image-capturing device 201 and a position calculating part 202. The droplet discharge device 100 includes a carriage horizontal position control part 420 that controls the carriage horizontal mover parts 42 and 43, based on the horizontal position of the storage vessel 5 detected by the horizontal position detecting part 2. The control in the horizontal position detecting part 2 and the carriage horizontal position control part 420 will be described in detail with reference to FIG. 8 and FIG. 9.

Figure 12:
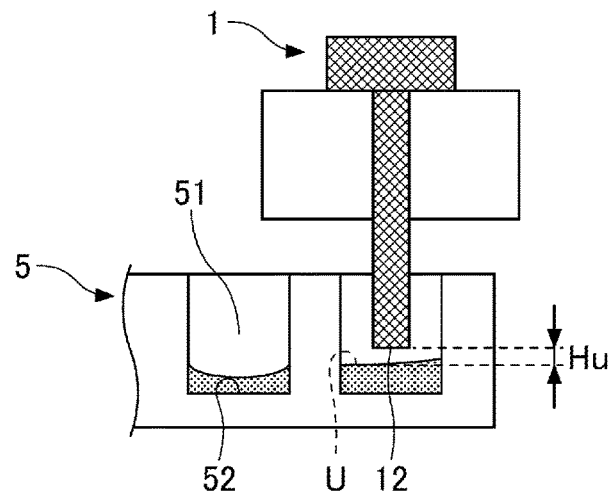
FIG. 12 is a view illustrating a position of the discharge head relative to an upper surface of a discharged object in the recess part.

The target position detecting part 3 detects the distance from a reference height in the vertical direction to a bottom surface 52 of the recess part 51 the storage vessel 5 (see FIG. 7A), which is the discharge target surface (discharged surface) on which droplets land, or to an upper surface U of the previously discharged object (see FIG. 12). As shown in FIG. 3, the droplet discharge device 100 includes a carriage elevation control part 410 that controls the carriage elevating part 41 based on the distance to the bottom surface 52 or the upper surface of the discharged object detected by the target position detecting part 3. The carriage elevation control part 410 in the present embodiment functions as a vertical position adjustment control part that controls the vertical position adjusting part that changes the relative position in the vertical direction between the discharge head and the storage vessel 5 mounted on the mounting table 6. Operations of the target position detecting part 3 and the carriage elevation control part 410 will be described in detail with reference to FIG. 4 through FIG. 7.

Figure 4A:
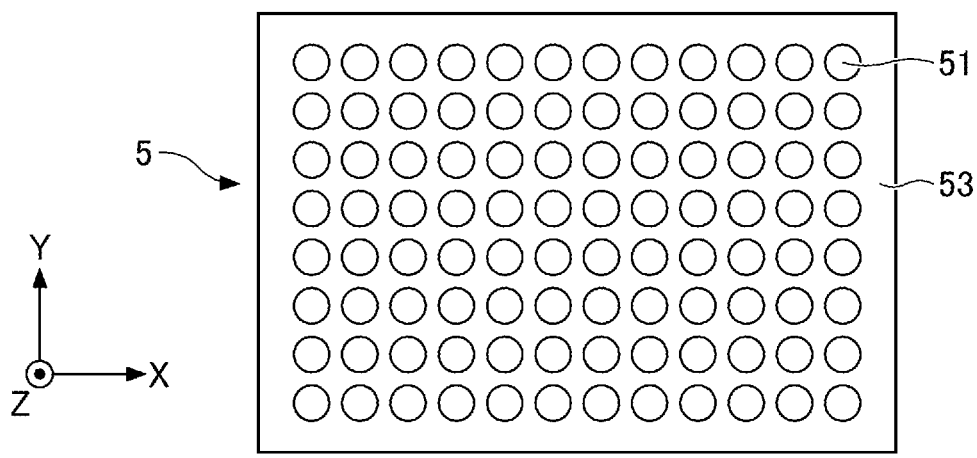
FIG. 4A and FIG. 4B are explanatory views of an example of the storage vessel.
Figure 4B:
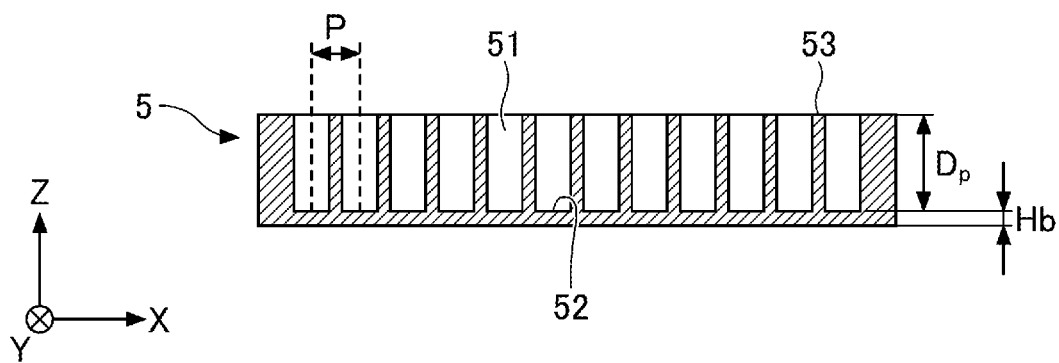

FIG. 4A and FIG. 4B illustrate an example of the storage vessel 5. FIG. 4A is a top view of the storage vessel 5, and FIG. 4B is a side cross-sectional view of the storage vessel 5.

The storage vessel 5 to which droplets are discharged is, for example, a flat well plate having a plurality of well-shaped recess parts (wells) 51. A well plate is an example of a vessel containing a tissue body, which is used in fields such as drug development and toxicity evaluation. In addition, the storage vessel 5 is not limited to a well plate, and may have a plate shape such as a plate or a slide glass, or may have a tube shape. In any case, a recess part is formed, and droplets are discharged to the recess part. An example in which plurality of recess parts 51 is formed in the storage vessel 5 will be described below, however, one recess part 51 may be formed.

When the storage vessel 5 is a well plate, the liquid discharged as droplets from the discharge head 1 is a cell suspension in which cells are suspended, a material constituting a living body, a biocompatible material, or the like.

In the case where the plurality of recess parts 51 are formed in the storage vessel 5, as an example, as illustrated in FIG. 4A, the plurality of recess parts 51 are arranged in two horizontal directions (the X-direction and the Y-direction). As shown in FIG. 4B, a depth Dp of the recess part 51 of the storage vessel 5 is determined according to a distance Hb between the installation surface of the storage vessel 5 and the recess part bottom surface 52, that is, the thickness of the bottom portion of the of the storage vessel 5.

The plurality of recess parts 51 provided in the storage vessel 5 may not be aligned as illustrated in FIG. 4A, and may be arranged, for example, in a staggered manner, arranged in any one direction, or arranged at random when seen from a top view.

For example, a discharge height Hg from the discharge surface 12 to the recess part bottom surface 52 is 0.5 to 10 mm, a space P between the adjacent recess parts 51 is 9 to 39 mm, and the depth Dp of the recess part 51 is 11 to 18 mm. When the storage vessel 5 having such recess parts 51 is a discharge target, if the depth Dp of the recess part 51 is longer than the space P between the adjacent recess parts 51, the effect of the detection and discharge operation according to the present disclosure is further increased.

Directions may be indicated by an X-axis, a Y-axis, and a Z-axis in the following drawings, an X-direction along the X-axis indicates a predetermined direction in a plane in which a plurality of recess parts 51 formed in the storage vessel 5 are arranged as shown in FIG. 4A, a Y-direction along the Y-axis indicates a direction orthogonal to the X-direction in the plane, and a Z-direction along the Z-axis indicates a direction orthogonal to the plane.

Further, a direction in which an arrow is directed in the X-direction is referred to as a +X-direction, a direction opposite to the +X-direction is referred to as −X-direction, a direction in which an arrow is directed in the Y-direction is referred to as +Y-direction, a direction opposite to the +Y-direction is referred to as a −Y-direction, a direction in which an arrow is directed in the Z-direct is referred to as a +Z-direction, and a direction opposite to the +Z-direction is referred to as a −Z-direction. In the embodiment, it is assumed that the discharge head discharges droplets to the −Z-direction (lower side) as an example.

The storage vessel 5 is placed on a mounting table 6. In the present embodiment, the position of the mounting table 6 is fixed by a mounting table supporting unit 61. The mounting table 6 is also provided with a storage vessel detecting part 7 that detects that the storage vessel 5 is placed on the mounting table 6.

Furthermore, the droplet discharge device 100 includes a liquid supply part 8 that supplies discharge liquid to the discharge head 1. The liquid supply part 8 is supported by a supply part supporting unit 81 and the position of the liquid supply part is fixed. As shown in FIG. 3, the droplet discharge device 100 also includes a liquid supply control part 80 that controls the supply of the liquid from the liquid supply part 8 to the discharge head 1.

In the present embodiment, the supply part supporting unit 81, the carriage supporting units 44, and the mounting table supporting unit 61 are erected from a base member 9 which is foundation of the droplet discharge device 100, and are fixed on the base member 9.

Directions may be indicated by an X-axis, a Y-axis, and a Z-axis in the following drawings, an X-direction along the X-axis indicates a predetermined direction (see FIG. 10A) in a plane in which a plurality of recess parts 51 formed in the storage vessel 5 are arranged, a Y-direction along the Y-axis indicates a direction orthogonal to the X-direction in the plane, and a Z-direction along the Z-axis indicates a direction orthogonal to the plane.

In addition, a direction in which an arrow is directed in the X-direction is referred to as a +X-direction, a direction opposite, to the +X-direction is referred to as a −X-direction, a direction in which an arrow is directed in the Y-direction is referred to as a +Y-direction, a direction opposite to the +Y-direction is referred to as a −Y-direction, a direction in which an arrow is directed in the Z-direction is referred to as +Z-direction, and a direction opposite to the +Z-direction is referred to as a −Z-direction. In the embodiment, it is assumed that the discharge head discharges droplets to the −Z-direction (lower side) as an example.

Discharge Operation

Figure 7B:
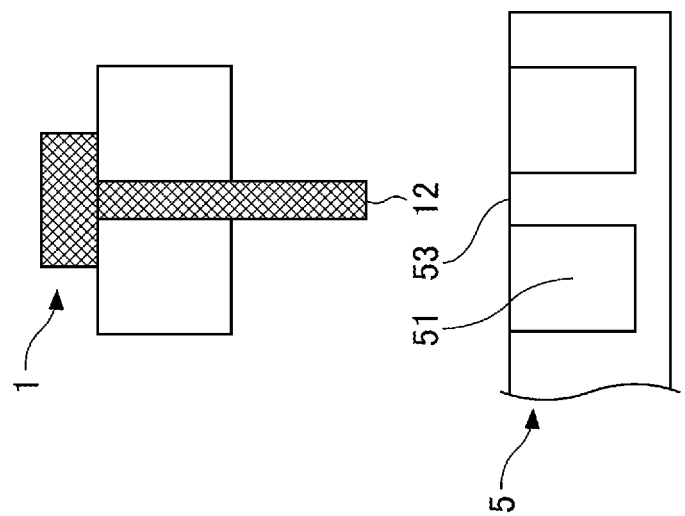
FIG. 7A and FIG. 7B are diagrams illustrating the position of the discharge head relative to recess parts of the storage vessel during the discharge operation and during movement, respectively.
Figure 7A:
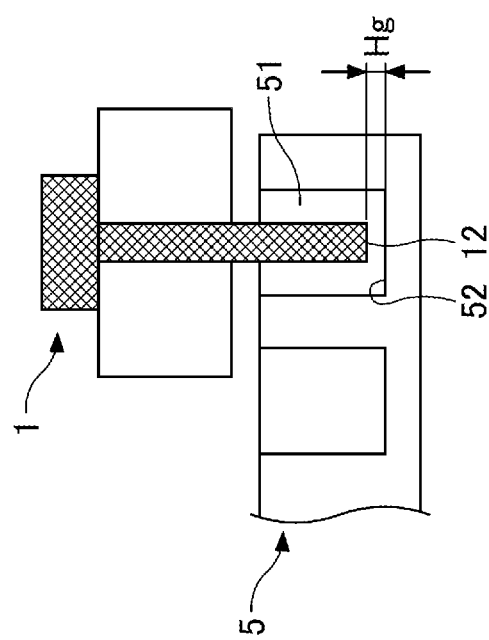

The droplet discharge operation will be described with reference to FIG. 5 through FIG. 7. FIG. 5 is an overall side view of the droplet discharge device during the discharge operation according to the first embodiment. FIG. 6 is an enlarged view illustrating the discharge head and storage vessel during the discharge operation. FIG. 7A and FIG. 7B are diagrams illustrating the position of the discharge head 1 relative to the storage vessel 5 during the discharge operation and during movement, respectively.

As shown in FIG. 5, FIG. 6, and FIG. 7, the discharge head 1 discharges a droplet L into the recess part 51 while moving in the horizontal direction in a state where the discharge surface 12 formed with the nozzle hole 11 that discharges the droplet is inserted into the recess part 51 of the storage vessel 5.

As shown in FIG. 3, the discharge head includes a discharge control part 101, a drive waveform generating part 102, and a micro electro mechanical system (MEMS) chip 103. An outer side surface of the MEMS chip 103 constitutes the discharge surface 12 which is a lower surface (tip end surface) of the discharge head and the nozzle hole 11 is formed to pierce the MEMS chip 103. When the drive waveform generating part 102 applies a drive waveform (drive voltage) to the MEMS chip 103 at a timing controlled by the discharge control part 101, the discharge head 1 discharges the liquid stored on the inner side of the MEMS chip 103 through the nozzle hole 11 to the recess part 51 as the droplet L.

In the discharge head 1, from the viewpoint of arrangement accuracy of the droplet L in the recess part 51, it is preferable that the discharge surface 12 of the discharge head 1 is positioned within a height range of 0.5 to 3.0 mm from the bottom surface 52 of the recess part 51 during the discharge operation. For example, since the height of each recess part (well) 51 in a 96-well plate, which is an example of storage vessel 5, is approximately 12 mm, it is preferable that the opening surface (discharge surface) 12 of the nozzle hole 11 is placed at depth of 70% or more of the depth of the recess part 51 during the discharge operation.

If droplets are discharged in a state in which the discharge surface 12 is above an upper surface 53 (outside of the recess part 51), since the distance from the discharge surface 12 to the bottom surface 52 of the recess part 51 is long, the falling distance becomes long, and the arrangement accuracy of droplets in the recess part 51 may be degraded. In a case where the discharge surface 12 is placed at a depth of about a few percent of the whole depth of the recess part 51 from the opening side (the opposite side of the bottom portion in the Z-direction) to discharge the droplets, since the distance from the discharge surface 12 to the bottom surface 52 of the recess part 51 is similarly long, the arrangement accuracy of droplets may be degraded. Therefore, when the distance between the discharge surface 12 and the bottom surface 52 of the recess part 51 is long, a part of the discharged liquid may be scattered, and a desired shape of the droplet may not be obtained.

On the other hand, in the control of the present disclosure, since the droplet is discharged in a state where the discharge surface 12 in which the nozzle hole 11 is formed is positioned inside the recess part 51, it is possible to discharge the droplet L at a short distance from the bottom surface 52 of the recess part 51. As a result, the arrangement accuracy of the droplets in the recess part 51 can be improved. It is also possible, to suppress a part of the discharged liquid from scattering by discharging the droplet to the bottom surface from a short distance.

When the discharge surface 12 having the nozzle holes 11 is brought close to the bottom surface 52 of the recess part 51, it is preferable for the discharge head 1 to not interfere with the bottom surface 52 of the recess part 51 and the upper surfaces 53, by moving the discharge head 1 horizontally and vertically so as to not come into contact with the inner surfaces of the recess part 51.

Here, the one or more recess parts 51 formed in the storage vessel 5 have a substantially cylindrical shape, a substantially quadrangular prism shape, or the like. It is preferable that the bottom surface 52 of the recess part 51 is flat, however, the bottom surface 52 may be inclined or uneven due to manufacturing errors. Further, the depths of the plurality of recess parts 51 formed in one storage vessel 5 may vary due to manufacturing errors or the like, or the plurality of depths may be intentionally set for recess parts in one storage vessel 5 to cause a difference in the storage amount of the discharged object.

Alternatively, in a case where a storage vessel of a different type (for example, a well plate, a slide glass, a petri dish, or the like) is replaced and used as the storage vessel 5, or in a case where a storage vessel of the same type as the storage vessel 5 but manufactured by a different manufacturer is used, the depth of the recess part is different from that in the previous discharge operation immediately after the replacement.

Specifically, in the storage vessel 5, due to the variation in the bottom portion thickness Hb shown in FIG. 4B, which is the distance from the installation surface of the storage vessel 5 to the recess part bottom surface 52, the variation also occurs, as shown in FIG. 7A, in the distance between the discharge surface 12 of the discharge head 1 and the bottom surface 52 of the recess part 51 of the storage vessel 5 during the discharge operation, that is the discharge height (discharge distance) of the discharge surface 12 relative to the recess part bottom surface 52.

Therefore, it is preferable to control the height of the discharge head 1 such that the discharge height Hg relative to the discharge target (discharged surface, recess part bottom surface) shown in FIG. 7A stays constant to maintain the arrangement accuracy of the droplets discharged onto the bottom surface 52 of the recess part 51.

Therefore, the target position detecting part 3 detects the distance from a reference height to the recess part bottom surface 52 immediately before the discharge operation to each recess part 51 to ascertain in advance the variation the depth of the, recess part 51, the surface unevenness of the bottom surface 52, and the like.

Detection of Distance to Recess Part Bottom Surface

Figure 8:
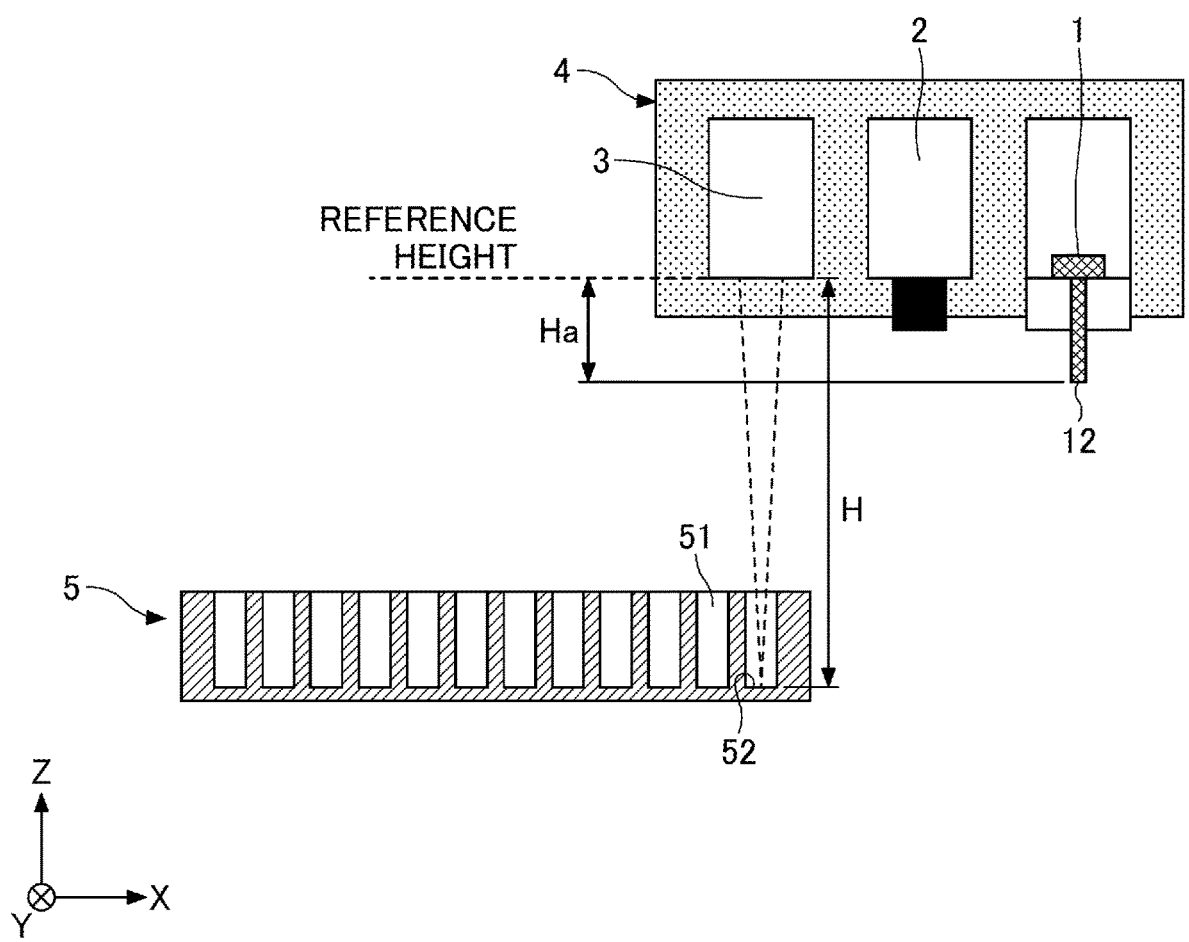
FIG. 8 is a diagram illustrating a position of a target position detecting part relative to the bottom surface of the recess part of the storage vessel during target position detection.

FIG. 8 is a diagram illustrating the position of the target position detecting part relative to the recess part bottom surface 52 of the storage vessel 5 during target position detection.

Since the discharge head 1, the horizontal position detecting part 2, and the target position detecting part 3 are all provided on the carriage 4, the discharge head 1, the horizontal position detecting part 2, and the target position detecting part 3 move as the carriage 4 moves. Therefore, the relative positions of the discharge head 1, the horizontal position detecting part 2, and the target position detecting part 3 in the horizontal direction (the X-direction and the Y-direction) and in the vertical direction (the Z-direction) are fixed.

The target position detecting part 3 is, for example, an optical sensor. Although only optical paths are indicated by dotted lines in FIG. 8, the optical sensor detects a distance from the optical sensor to the recess part bottom surface 52 by reflecting the light emitted from a light emitting part at the bottom surface 52 of the recess part 51 and receiving the returned light by a light receiving part. Therefore, at the time of detection, as shown in FIG. 8, the target position detecting part 3 is set to be positioned in a region facing the recess part 51 to be detected in the horizontal direction as well as at the reference height in the vertical direction.

Then, the target position detecting part 3 detects, before starting the discharge to a first recess part 51 which is the discharge destination, the distance from the vertical reference height to the bottom surface 52 of the recess part 51 of the storage vessel 5.

When it is desired to detect only the variation in depth between the plurality of recess parts 51 without considering the unevenness of the bottom surface 52 of the first target recess part 51, only specific points, for example, only one point is detected for one recess part. In this case, the carriage elevation control part 410 firstly calculates the amount of movement of the discharge head 1 based on the detected distance to the discharge target surface of the recess part, such that the discharge height Hg of the discharge surface 12 relative to the recess part bottom surface 52 (the distance between the discharge surface 12 of the discharge head 1 and the recess part bottom surface 52) stays constant among the plurality of recess parts 51 to which droplets are discharged. The carriage elevation control part 410 then controls the vertical position of the discharge head 1 immediately before starting discharge to the first recess part.

On the other hand, when it is desired to detect not only the depth of the recess part 51 but also the inclination or unevenness of the bottom surface 52 of the recess part 51, a distance from the vertical reference height to each of a plurality of points in the entire horizontal region of the bottom surface of the first recess part of the storage vessel 5 is detected. In this case, based on the each detected distance to the discharge target surface (recess part bottom surface 52) of the recess part 51, the carriage elevation control part 410 controls the vertical position discharge head not only immediately before the discharge but also during the discharge to the recess part 51 such that the discharge height Hg of the discharge surface 12 relative to the recess part bottom surface 52 stays constant in the entire horizontal region of the recess part 51.

Specifically, in each case, a required vertical movement amount D of the discharge head for the carriage elevating part 41 from the reference height is calculated from the following equation by detecting a distance H between the target position detecting part 3 and the recess part bottom surface 52 of the storage vessel 5 shown in FIG. 8:

$$D=H-Ha-Hg$$

Ha is the distance between the target position detecting part 3 and the discharge surface 12 of the discharge head 1 when the carriage 4 is at the reference height as shown in FIG. 8, and is known because it is determined by the arrangement.

In this way, the required vertical movement amount D of the discharge head 1 during discharge can be calculated from the detected distance to the discharge target surface when the carriage is at the reference height. By using the movement amount, the vertical position of the discharge head adjusted by the carriage elevating part 41 such that the discharge height Hg of the discharge surface 12 relative to the recess part bottom surface at the time of discharge shown in FIG. 7A stays constant for the plurality of recess parts, for the entire recess part, or for the plurality of recess parts as well as for the entire recess part, during the discharge operation. By controlling the vertical movement amount of the discharge head in this way, the insertion depth of the discharge head 1 into the recess part 51 is adjusted.

Even when the recess part is deep relative to the distance between the adjacent recess parts in the storage vessel of the discharge target and the recess part bottom surface is uneven or distorted, it is possible to appropriately ascertain the depth of the recess part, and perform the discharge operation suitable for the depth of the recess part. By discharging droplets from a uniform discharge height onto the target surface such as the recess part bottom surface to be suitable for the depth of the recess part in this manner, the sizes of the landed droplets discharged into the recess part of the storage vessel can be made uniform, and the arrangement accuracy of the droplets can be improved.

Position Detection in Horizontal Direction

Figure 9:
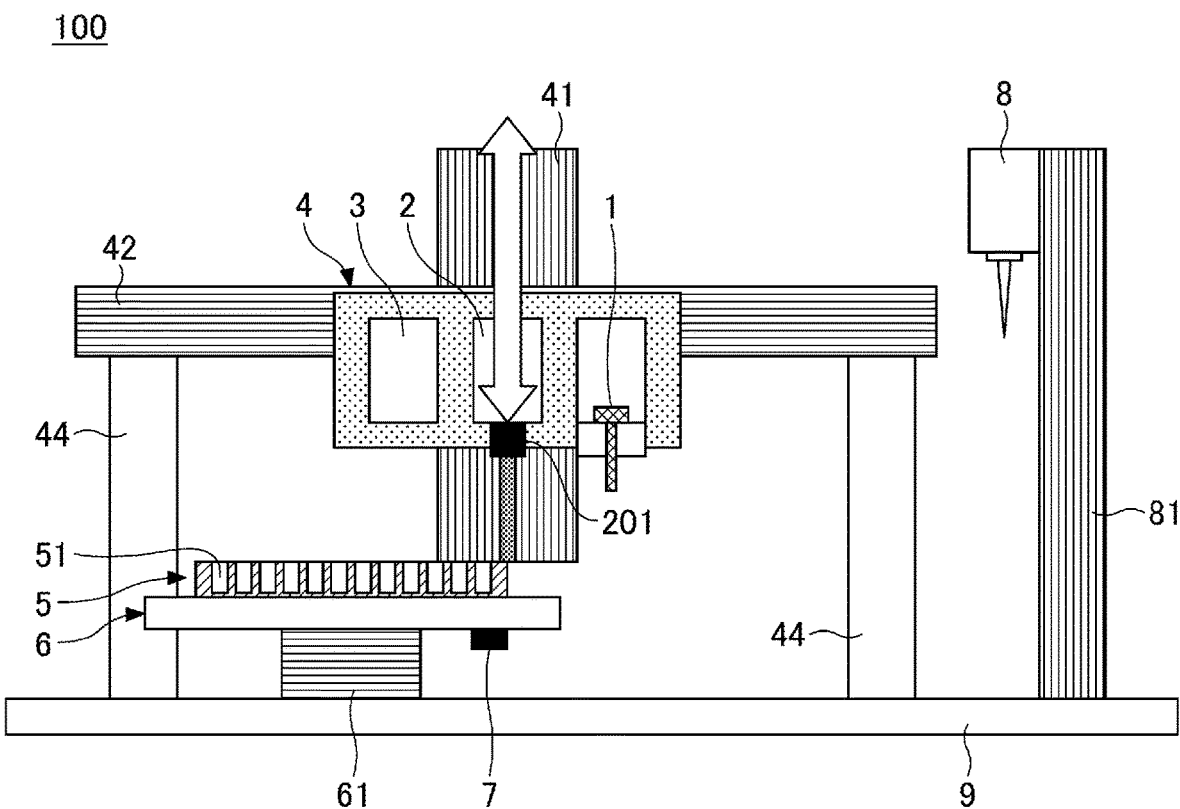
FIG. 9 is a diagram illustrating the position of a horizontal position detecting part relative to the storage vessel during horizontal position detection.
Figure 10A:
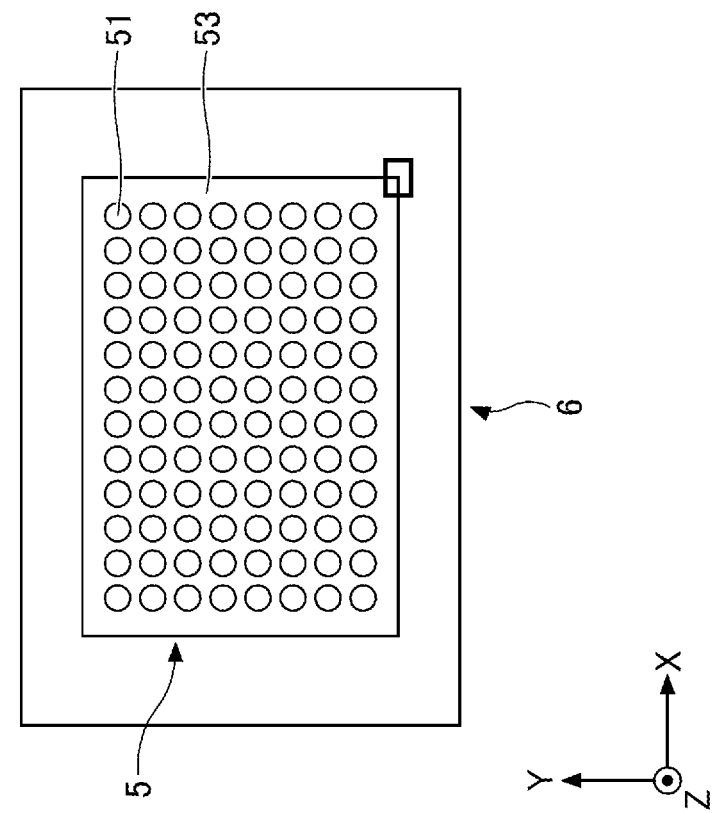
FIG. 10A and FIG. 10B are explanatory diagrams of a captured image of the storage vessel on a mounting table captured by the horizontal position detecting part and of a displacement of the storage vessel, respectively.
Figure 10B:
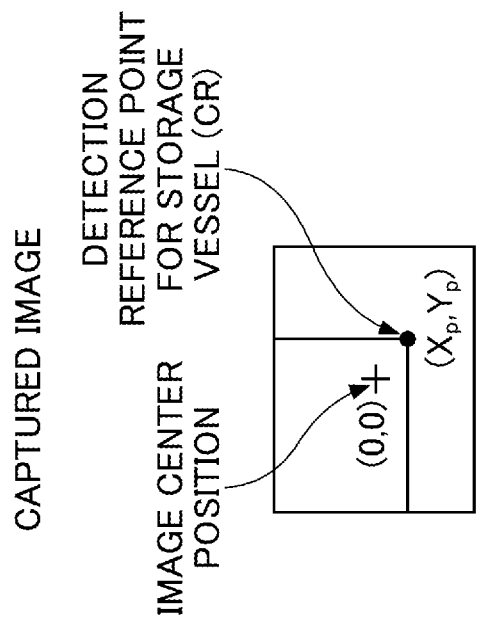

The horizontal position of the storage vessel will be described with reference to FIG. 9, FIG. 10A and FIG. 10B. FIG. 9 is a diagram illustrating the position of the horizontal position detecting part 2 relative to the storage vessel 5 during horizontal position detection. FIG. 10A and FIG. 10B are explanatory diagrams of a captured image of the storage vessel 5 on the mounting table 6 captured by the horizontal position detecting part 2 and of a displacement of the storage vessel 5, respectively.

Here, the storage vessel 5 can be replaced and installed on the mounting table 6. For example, in a case of different types of the storage vessel 5 (for example, a slide glass, a petri dish, and a well plate) or storage vessels of the same type but by different manufacturers, the depth and the size of the recess part 51 and the size of the entire storage vessel 5 are different.

Therefore, in the droplet discharge device 100, it is required to detect the position of the storage vessel 5 on the mounting table 6 so that an appropriate discharge operation can be performed even for the storage vessels 5 of various types and sizes.

As shown in FIG. 3 described above, the horizontal position detecting part 2 includes the image-capturing device (camera) 201 and the position calculating part 202. As shown in FIG. 9, since the horizontal position detecting part 2 provided in the carriage 4, the horizontal position detecting part 2 can move in the horizontal direction, relative to the storage vessel 5, along with the discharge head 1.

When a storage vessel detecting part 7 detects that the storage vessel 5 is newly set on the mounting table 6, if the horizontal position detecting part 2 is not at a position facing the storage vessel 5 as shown in FIG. 9, the carriage 4 is moved to move the horizontal position detecting part 2 to the position.

Specifically, a detection reference point serving as a reference point of the position on the discharge target side set on the storage vessel 5. Although FIG. 10A illustrates an example in which a corner area of the storage vessel 5 is set as the detection reference point, a mark for defining the detection reference point may be provided on the storage vessel 5.

As illustrated in FIG. 9, the image-capturing device 201 being located at a position facing the storage vessel 5 on the mounting table 6 photographs the storage vessel 5 on the mounting table 6 from a photographing reference position with a fixed photographing reference point as the center. FIG. 10A shows an example of the captured image. When the image-capturing device 201 captures an image of a detection reference point (storage vessel reference point) CR of the storage vessel 5 at the photographing reference position, the storage vessel reference point CR is included in the acquired image.

Further, the storage vessel detecting part 7 can detect the type information of the storage vessel 5 when detecting that the storage vessel 5 is placed on the mounting table 6. From the type information, it is possible to acquire information on the overall size of the storage vessel 5, the diameter of the recess part 51, and the space between the recess parts 51. At this time, the storage vessel detecting part 7 may, for example, identify the storage vessel by RFID (Radio Frequency Identification), or identify the type of the storage vessel registered in advance by weight. Alternatively, type information of the storage vessel 5 may be input to the droplet discharge device 100 in advance.

An installation variation of where the storage vessel 5, whose size and shape are known by detection or input, is installed on the mounting table 6 is then detected by image-capturing. Specifically, in the captured image, the position calculating part 202 calculates the displacement of the detection reference point CR of the storage vessel from the image center position in two directions (X-direction and Y-direction) orthogonal to each other in the horizontal direction, and determines the position of the storage vessel 5 on the mounting table 6. Specifically, the coordinates (Xp, Yp) of the detection reference point CR of the storage vessel 5 from the center of the acquired image are acquired by image processing, and the displacement from the image center is calculated as a correction value for the discharge position at which discharge is performed from the discharge head 1.

The carriage horizontal position control part (head horizontal position control part) 420 drives the carriage 4 to move the discharge head 1 during the discharge such that the droplets are discharged to the target position of the target recess part 51 of the storage vessel 5 whose position is known.

In this way, detecting the horizontal position of the storage vessel 5 in advance, it is possible to discharge droplets to a target position on the storage vessel 5 without error.

Overall Flow

Figure 11:
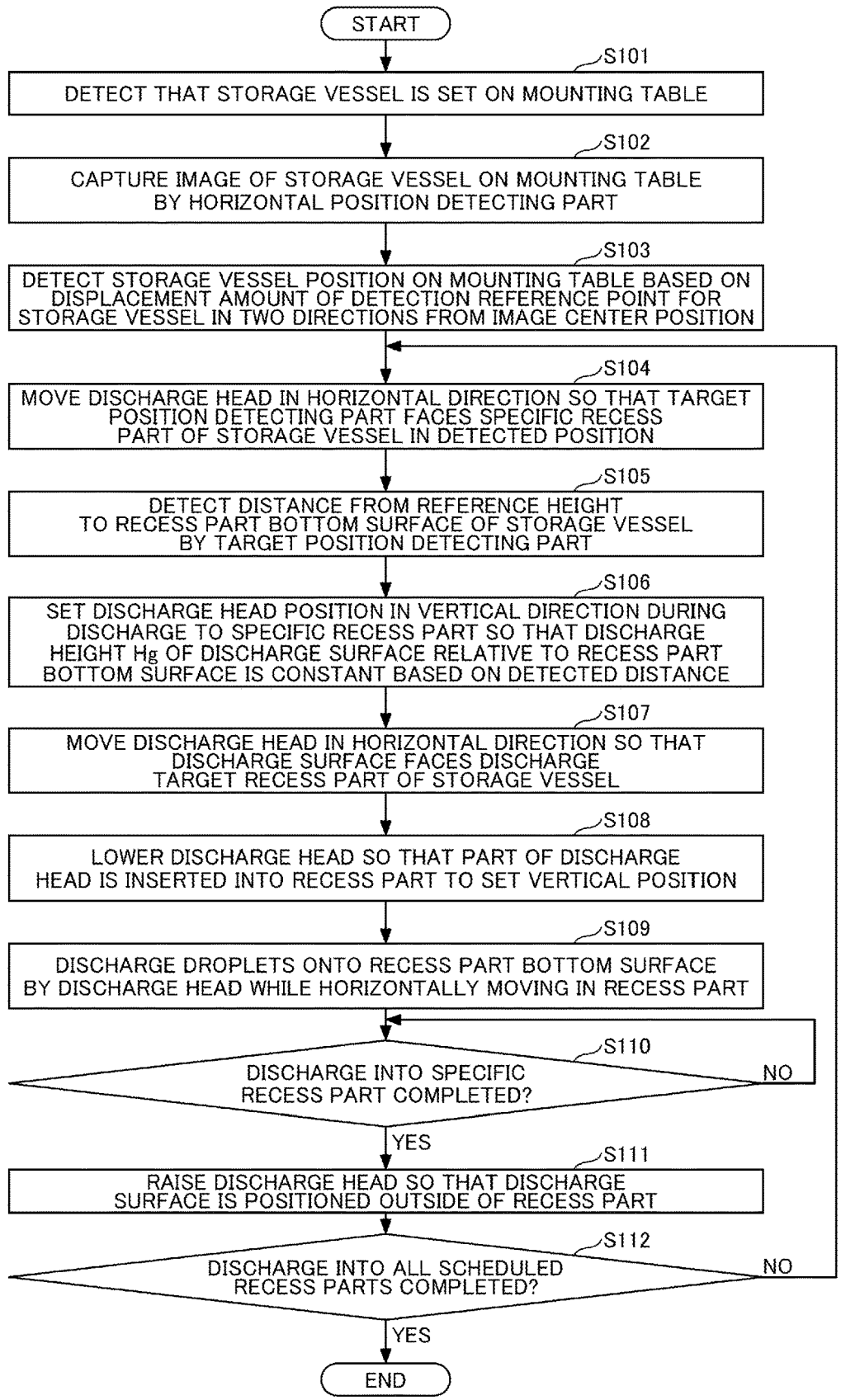
FIG. 11 is a flowchart of a droplet discharge operation in the first control example.

The overall flow of the droplet discharge operation including the target position detection and the horizontal position detection will be described with reference to FIG. 11. FIG. 11 is a flowchart of the droplet discharge operation in the first control example.

In S101, the storage vessel detecting part 7 detects that the storage vessel 5 is set on the mounting table 6. After this detection, where appropriate, the horizontal position detecting part 2 instructs the carriage horizontal mover parts 42 and 43 to move the horizontal position of the carriage 4 to be at a position facing the detection reference point CR of the storage vessel 5.

In S102, the image-capturing device 201 of the horizontal position detecting part photographs the storage vessel 5 on the mounting table 6 from above.

In S103, the position calculating part 202 of the horizontal position detecting part 2 calculates the position of the storage vessel 5 on the mounting table 6 based on the displacement of the detection reference point CR for the storage vessel 5 in the two horizontal directions (X and Y) from the image center position. S102 and S103 are horizontal position detection steps.

In S104, the carriage 4 is moved horizontally to move the discharge head 1 horizontally so that the target position detecting part 3 faces the target recess part (first recess part) 51 of the storage vessel 5 in the detected position.

In S105, for the entire horizontal region of first recess part, the target position detecting part 3 detects the distance H from the vertical reference height to the recess part bottom surface 52 of the first recess part 51 of the storage vessel 5 before starting the discharge to the first recess part 51. At this time, depending on the setting situation, the distance H may be detected at only a specific point in the recess part bottom surface 52, or the distance H may be detected at a plurality of points for the entire horizontal region of first recess part. S105 is a target position detecting step.

In S106, based on the detected distance H to the first recess part bottom surface 52, the vertical position of the discharge head 1 at the time of discharge to the first recess part is set such that the discharge height (distance from the bottom surface of the first recess part) Hg of the discharge surface 12 of the discharge head 1 relative to the recess part bottom surface 52 stays constant. Specifically, the amount of movement by which the carriage 4 on which the discharge head 1 is mounted is lowered by the carriage elevating part 41 is set. S106 is a vertical position setting step.

In S107, the, carriage 4 is moved horizontally to move the discharge head 1 horizontally so that the discharge surface 12 faces a specific recess part 51 of the storage vessel 5 in the detected position.

In S108, the carriage 4 is lowered to lower the discharge head so that a part of the discharge head 1 is inserted into the recess part 51 to the set vertical position where the distance between the discharge surface 12 and the recess part bottom surface 52 becomes the set discharge height Hg.

In S109, the discharge head 1 performs a droplet discharge operation onto the recess part bottom surface 52 while horizontally moving in the recess part whose horizontal position has been detected. S109 is a droplet discharging step.

When the target position detecting part 3 detects the distance H at only one specific point of the recess part in S105, the vertical position of the discharge head 1 is controlled at S109 immediately before the discharge such that the discharge height Hg of the discharge surface 12 relative to the recess part bottom surface 52 stays constant among the plurality of recess parts 51 to which droplets are discharged, and the vertical position of the discharge head 1 is then fixed during the discharge operation in S110.

On the other hand, when the target position detecting part 3 detects the distance H for the plurality of points for the entire horizontal region of the first recess part in S105, the vertical position of the discharge head 1 is controlled in S109 immediately before starting discharge, and then, even during the discharge operation in S110, the vertical position of the discharge head 1 is moved according to the detection result in addition to the movement in the horizontal direction.

Once the droplet discharge operation to the specific recess part is completed in S110, the discharge head is moved so that the discharge surface is positioned outside of the recess part in S111.

In S112, if the discharge operation to all the scheduled recess parts is not completed (NO), the process returns to S104, and the operation from S104 to S110 is repeated for the next recess part.

In S112, when the discharge to all the scheduled recess parts is completed, the discharge operation is ended.

According to the above droplet discharge method of the present embodiment, by detecting the distance to the discharge target surface of the recess part in the vertical direction for each discharge operation to the recess part, even in a storage vessel having a deep recess part, it is possible to appropriately adjust the discharge position, and always keep the distance to the discharge target surface of the recess part constant at the time of discharge. Therefore, the sizes of the landed droplets discharged into the recess part can be made uniform, and the arrangement accuracy of the droplets can be improved.

Detection in Case of Overlapping Discharge
(Second Control Example)

In the above description, an example has been described, for the case that discharge is performed to the first recess part for the first time, in which the discharge target surface of the recess part relative to which the discharge height is to be adjusted is an upper surface that is the bottom surface 52 of the recess part 51. However, when droplets are discharged to the same position in the first recess part in an overlapping manner, the discharge target surface is the upper surface of the discharged object previously discharged from the discharge head and landed on the bottom surface of the recess part. The control in this case will be described.

Figure 13:
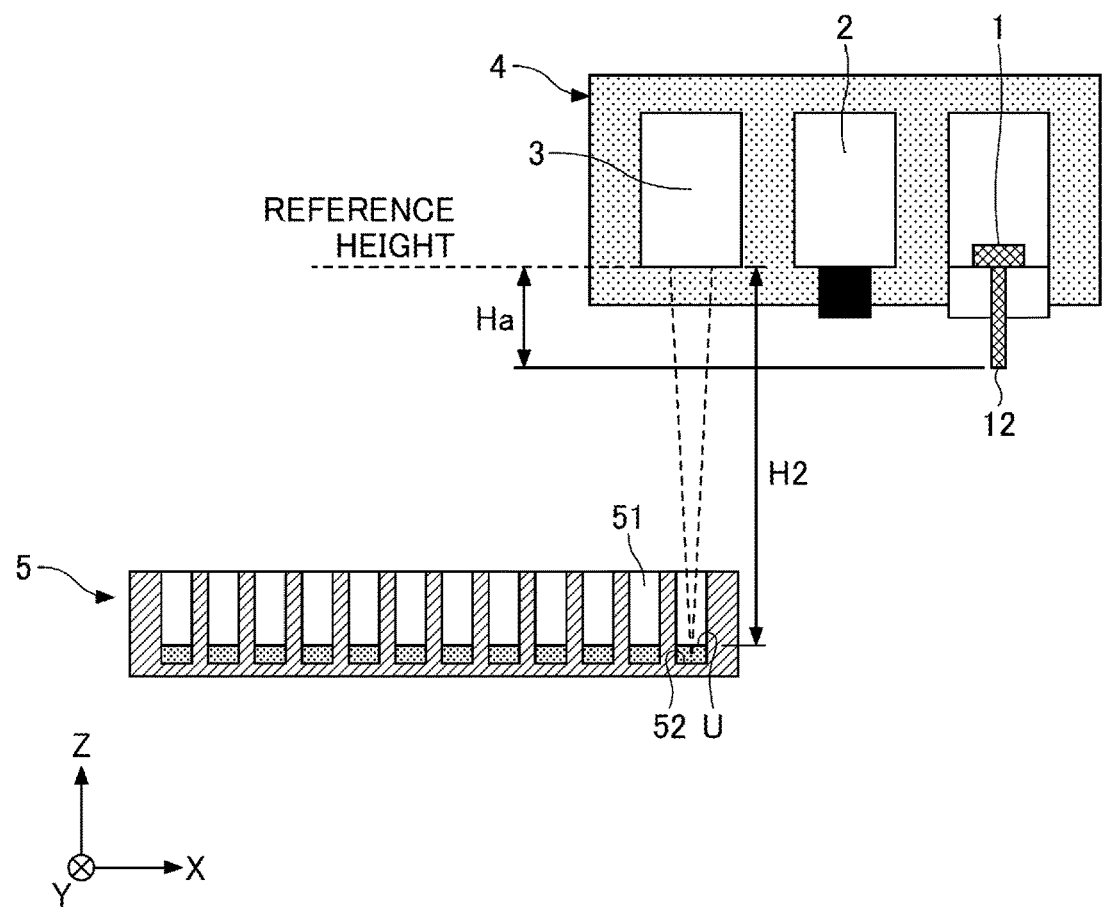
FIG. 13 is a diagram illustrating a position of the target position detecting part relative to the upper surface of the discharged object in the recess part of the storage vessel during target position detection.

FIG. 12 is a view showing the position of the discharge head 1 relative to the upper surface U of the discharged object in the recess part 51. FIG. 13 is a diagram illustrating the position of the target position detecting part 3 relative to the upper surface U of the discharged object in the recess part 51 of the storage vessel 5 during the target position detection.

As shown in FIG. 13, when droplets are discharged to the same position of the same recess part in an overlapping manner, the target position detecting part 3 detects a distance H2 from the reference height to an upper surface U of the discharged object landed on the recess part bottom surface 52 (upper surface of the deposited object).

At this time, when it is desired to detect only the variation in depth between the plurality of recess parts 51 without considering the unevenness of the bottom surface 52 in the first target recess part 51, the distance H2 is detected only at specific points, for example, at one point, for one recess part.

In this case, first, the carriage elevation control part 410 calculates, based on the detected distance to the discharge target surface of the recess part, the movement amount of the discharge head 1 such that a discharge height Hu of the discharge surface 12 relative to the discharged object upper surface U (the distance from the discharge surface 12 of the discharge head 1 to the discharged object upper surface U) stays constant among the plurality of recess parts 51 to which droplets are discharged. The carriage elevation control part 410 then controls the vertical position of the discharge head 1 immediately before starting discharge to the first recess part.

On the other hand, for example, in the case where the high viscosity of the liquid is discharged, as shown in FIG. 12, even in the same recess part 51, the upper surface of the first layer previously discharged may have a non-flat surface such as an inclined surface or an uneven surface. When it is desired to detect the inclination and the unevenness of the liquid discharged object landed in the recess part 51, each distance H2 from the vertical reference height to each of the specific points on the discharged object upper surface U is detected for the entire horizontal region of the first recess part 51 of the storage vessel 5.

In this case, based on the each vertical distance H2 detected at each horizontal coordinate point of the discharged object upper surface U in the recess part 51, the carriage elevation control part 410 controls the vertical position of the discharge head not only immediately before starting discharge but also during the discharge into the recess part 51 such that the discharge height Hg of the discharge surface 12 relative to the upper surface U of the deposited object stays constant over the entire horizontal region of the recess part 51. In the case where droplets are discharged to overlap the second layer, since there is possibility that the layered object is not flat as shown in FIG. 12, it is preferable to perform the present control in which the position adjustment is performed according to the distance H2 detected for the entire horizontal region of the recess part.

By adjusting in this way, even when the droplets are discharged to be layered on the discharged object, it is possible to discharge the droplets with the vertical head position being adjusted so that the height from the head to the upper surface of the discharged object becomes uniform.

Figure 14:
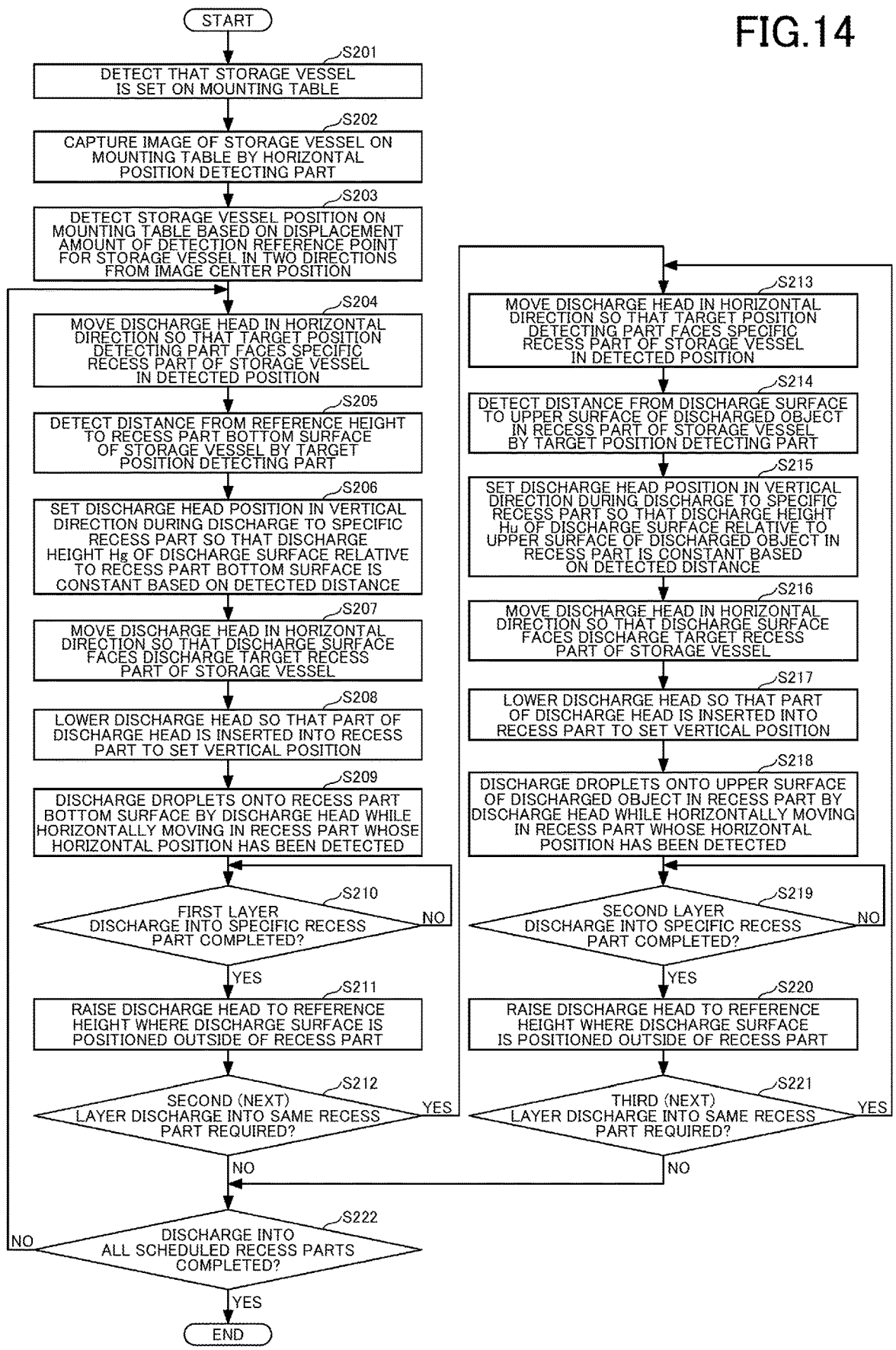
FIG. 14 is a flowchart of the droplet discharge operation in the second control example.

FIG. 14 a flowchart of the droplet discharge operation in the second control example. Only the differences from FIG. 11 will be described.

In S212, it is determined whether the droplet discharge operation of the second layer (next layer) is to be performed on the same recess part, and if the droplet discharge operation of the next layer is to be performed, the process proceeds to S213.

In S213, the discharge head is moved horizontally so that the target position detecting part 3 faces the recess part of the storage vessel 5 to which the first layer has been discharged.

In S214, the target position detecting part 3 detects the distance H2 from the discharge surface to the upper surface of the deposited object (discharged object upper surface) U in the recess part of the storage vessel. At this time, depending on the setting situation, the distance H2 may be detected at only one specific point relative to the upper surface of the deposited object, or the distance H2 may be detected at a plurality of points the entire horizontal region of the first recess part.

In S215, based on the detected distance, the vertical position of the discharge head 1 for the current discharge into the recess part 51 is set so that the discharge height Hg from the discharged object upper surface U to the discharge surface 12 of the discharge head 1 is constant.

In S216, the discharge head is moved horizontally so that the discharge surface faces the recess part of the storage vessel to receive discharge at the current time.

In S217 the discharge head is lowered so that the discharge head is at the set position and a part of the discharge head is inserted into the recess part.

In S218, the discharge head 1 discharges droplets onto the deposited layer surface of the recess part while horizontally moving in the recess part whose horizontal position has been detected. At this time, when the distance H2 has been detected for the entire horizontal region of the first recess part in S214, the vertical position of the discharge head 1 is moved according to the detection result in addition to the movement in the horizontal direction, even during the discharge operation in S218.

Once the droplet discharge operation for the second layer to the specific recess part is completed in S219, the discharge head is raised to the reference height where the discharge surface is positioned outside the recess part in 220.

In S221, if there is a droplet discharge operation for the third layer (next layer) to the same recess part, the process returns to S213, and the operation from S213 to S219 is repeated for the same recess part.

If there is no droplet discharge operation for the next layer (NO in S221), it is checked in S222 whether the droplet discharge operation has been completed for all the scheduled recess parts, that is, whether there is discharge for another recess. In a case where, discharge to all the recess parts is not completed and discharge to another recess part is to be performed, the process returns to S204 and the operation from S204 to S210 is repeated for the next recess part.

Also, in this second control, the distance to the recess part bottom surface in the vertical direction is detected for each discharge operation to the recess part, and the distance to the deposited object upper surface in the vertical direction is detected for each overlapping discharge operation to the recess part. As a result, even in the case of a storage vessel having a deep recess part or in the case where discharge is performed in an overlapping manner, the discharge position can be adjusted to an appropriate position and the distance to the discharge target surface of the recess part at the time of discharge can be always kept constant. Therefore, it is possible to make the sizes of the landed droplets discharged into the recess part uniform, to improve the arrangement accuracy of the droplets, and to prevent the discharge head from colliding with the deposited object.

Second Embodiment

Figure 15:
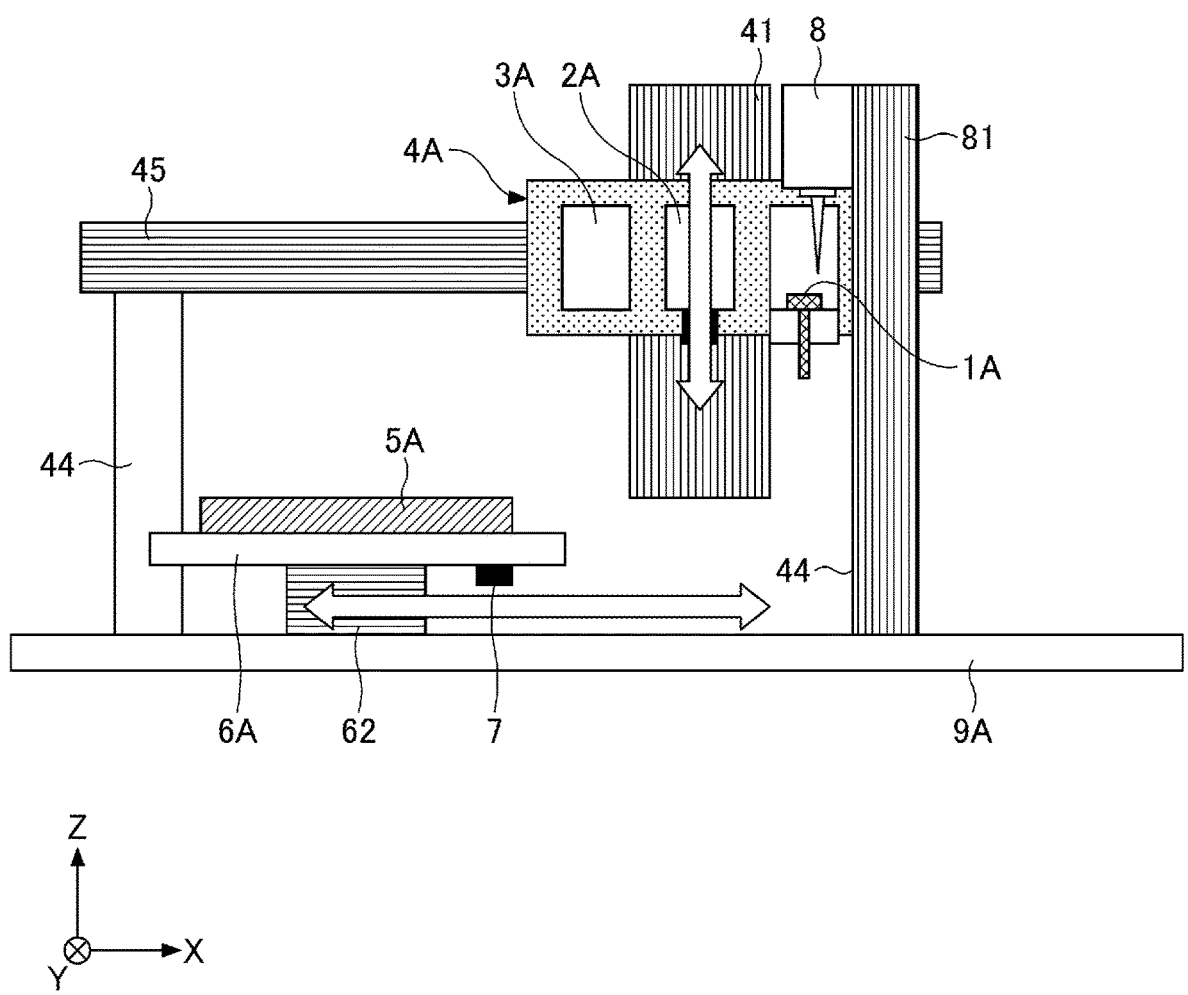
FIG. 15 is an overall side view of a droplet discharge device according to the second embodiment.

FIG. 15 shows an overall side view of a droplet discharge device 200 according to the second embodiment of the present disclosure.

In the above example, the carriage is moved both vertically and horizontally. However, in the present embodiment, the position of a storage vessel 5A relative to a discharge head 1A, and the like, can be changed by fixing the position of a carriage 4A in the horizontal direction and moving a mounting table 5A in the horizontal direction.

Specifically, as shown in FIG. 15, the carriage 4A is horizontally fixed and supported by a support table 45 at a position where the carriage 4A is supplied by the liquid supply part 8. The mounting table 6A is supported by a movement supporting unit 62, and the movement supporting unit 62 is movable in two directions of the X and Y-directions which are horizontal directions relative to a base member 9A.

The configuration of the present embodiment is different only in that when the discharge head 1A, a horizontal position detecting part 2A, and a target position detecting part 3A; and the storage vessel 5A are relatively moved in the horizontal direction, the position of the storage vessel 5A placed on the mounting table 6A is moved instead of the carriage, and other controls are the same.

In the present embodiment, for the vertical relative movement between the discharge head 1A and the storage vessel 5A, the carriage 4A side moves similarly to the first embodiment.

Modification 1

As a modified example of the second embodiment, a configuration may be adopted in which the carriage is fixed also in the vertical direction and the mounting table is movable in the horizontal directions (the X-direction and the Y-direction) as well as the vertical direction. In this configuration, during the relative movement, the storage vessel mounted on the mounting table is moved in the horizontal direction and the vertical direction relative to the discharge head, the horizontal position detecting part, and the target position detecting part. In this case, a mounting table elevating part that elevates the mounting table functions as the vertical position adjusting part that changes the vertical relative position between the discharge head and the mounting table.

Modification 2

As still another modified example, the carriage may be movable in the X direction and the Z-direction (vertical direction), and the mounting table may be movable in the Y-direction.

Modification 3

Alternatively, the carriage may be movable in the X-direction and the Y-direction, which are horizontal directions, and the mounting table may be movable in the Z-direction (vertical direction). Also, in this case, the mounting table elevating part that elevates the mounting table functions as the vertical position adjusting part that changes the vertical relative positron between the discharge head and the mounting table.

Modification 4

Further, both the carriage and the mounting table may be movable in the X-direction and the Y-direction, and any one of the carriage and the mounting table may be movable in the Z-direction (vertical direction).

Also, in the present embodiment and the modified examples, the distance to the recess part bottom surface in the vertical direction is detected every time the discharge operation to the recess part is performed, so that even for the storage vessel having a deep recess part, an appropriate discharge position can be adjusted and the distance to the recess part bottom surface at the time of discharge can be always kept constant. Therefore, the sizes of the landed droplets discharged into the recess part can be made uniform, and the arrangement accuracy of the droplets can be improved.

Further, in the present embodiment and the modified examples, as in the second control example, the droplets may be discharged in an overlapping manner. In that case, the vertical distance to the deposited object upper surface of the recess part is detected for each overlapping discharge operation. As a result, even in the case of a storage vessel having a deep recess part or even in the case where discharge is performed in an overlapping manner, an appropriate discharge position can be adjusted, and the distance to the discharge target surface of the recess part at the time of discharge can be always kept constant. Therefore, it is possible to make the sizes of the landed droplets discharged into the recess part uniform, to improve the arrangement accuracy of the droplets, and to prevent the discharge head from colliding with the deposited object.

Although preferred embodiments and the examples have been described in detail above, the present disclosure is not limited thereto, and various modifications and substitutions may be made without departing from the scope of the present disclosure.

What is claimed is:

1. A droplet discharge device comprising:
a storage vessel having a plurality of recess parts configured to store discharged droplets;
a discharge head configured to insert, into a recess part of the storage vessel, a discharge surface having a nozzle hole for discharging a droplet, and to discharge droplets into the recess part while moving in two horizontal directions;
a mounting table on which the storage vessel is mounted;
a vertical position adjusting part configured to vertically move the discharge head or the mounting table to change a relative vertical position between the discharge head and the mounting table;
a vertical position adjustment control part configured to control the vertical position adjusting part;
a horizontal position detecting part configured to detect a horizontal position of the storage vessel mounted on the mounting table; and
a target position detecting part configured to detect, before starting discharge into a first recess part of the storage vessel, a distance from a vertical reference height to a discharge target surface of the first recess part,
wherein the vertical position adjustment control part controls, based on the detected distance to the discharge target surface of the first recess part, a vertical position of the discharge head or the mounting table during discharge to the first recess part such that discharge height of the discharge surface relative to the discharge target surface stays constant.

2. The droplet discharge device according to claim 1, wherein when the droplets are discharged to the first recess part for a first time, the discharge target surface is a bottom surface of the first recess part.

3. The droplet discharge device according to claim 1, wherein when the droplets are discharged to the same position in the first recess part in an overlapping manner, the discharge target surface is an upper surface formed by droplets discharged from the discharge head and landed on the bottom surface of the first recess part.

4. The droplet discharge device according to claim 1, wherein the target position detecting part detects, before starting the discharge to the first recess part, the distance from the vertical reference height to the discharge target surface of the first recess part of the storage vessel at a predetermined point in the first recess part, and the vertical position adjustment control part controls, based on the detected distance to the discharge target surface of the first recess part, the vertical position of the discharge head or the mounting table immediately before starting the discharge to the first recess part such that the discharge height of the discharge surface relative to the discharge target surface stays constant among the plurality of recess parts to which droplets are discharged.

5. The droplet discharge device according to claim 1, wherein the target position detecting part:

detects the distance from the vertical reference height to the discharge target surface of the first recess part of the storage vessel over an entire horizontal area in the first recess part before starting the discharge to the first recess part; and controls the vertical position of the discharge head or the mounting table during the discharge to the first recess part such that the discharge height of the discharge surface relative to the discharged target surface stays constant across the entire horizontal area in the first recess part, based on the detected distance to the discharge target surface of the first recess part.

6. The droplet discharge device according to claim 1, further comprising a carriage configured to move the discharge head in a horizontal direction, wherein the target position detecting part and the horizontal position detecting part are mounted on the carriage, and wherein a relative position of the discharge head, the target position detecting part, and the horizontal position detecting part is fixed.

7. The droplet discharge device according to claim 6, further comprising a head horizontal position control part configured to control a horizontal position of the discharge head, wherein the horizontal position detecting part includes an image-capturing device and vessel position calculating part, and the storage vessel is detachable from the mounting table, and has a detection reference point, wherein the image-capturing device captures an image of the storage vessel on the mounting table such that a fixed imaging reference point situated at a center of the image, wherein the vessel position calculating part calculates, in the captured image, a displacement of the detection reference point of the storage vessel from an image center in two horizontal directions orthogonal to each other, thereby calculating a position of the storage vessel on the mounting table, and wherein the head horizontal position control part causes the carriage to move the discharge head during the discharge such that the droplets are discharged to respective target positions in a target recess part of the storage vessel whose position has been detected.

8. The droplet discharge device according to claim 1, further comprising a storage vessel detecting part configured to detect that the storage vessel is placed on the mounting table.

9. A droplet discharge device comprising:

a storage vessel having a plurality of recess parts configured to store discharged droplets;

a discharge head configured to insert, into a recess part of the storage vessel, a discharge surface having a nozzle hole for discharging a droplet, and to discharge droplets into the recess part;

a mounting table having the storage vessel mounted thereon and configured to be movable in two horizontal directions;

a vertical position adjusting part configured to vertically move the discharge head or the mounting table to change a relative vertical position between the discharge head and the mounting table;

a vertical position adjustment control part configured to control the vertical position adjusting part;

a horizontal position detecting part configured to detect a horizontal position of the storage vessel mounted on the mounting table; and a target position detecting part configured to detect, before starting discharge into a first recess part of the storage vessel, a distance from a vertical reference height to a discharge target surface of the first recess part, wherein the vertical position adjustment control part controls, based on the detected distance to the discharge target surface of the first recess part, the vertical position of the discharge head or the mounting table during the discharge to the first recess part such that a discharge height of the discharge surface relative to the discharge target surface stays constant.

\* \* \* \* \*